(12) United States Patent
Speer et al.

(10) Patent No.: US 7,357,352 B2
(45) Date of Patent: Apr. 15, 2008

(54) AIR VEHICLE ASSEMBLY AND AN ASSOCIATED CONTROL SYSTEM AND METHOD

(75) Inventors: Thomas E. Speer, Des Moines, WA (US); Richard D. Jones, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/270,342

(22) Filed: Nov. 9, 2005

(65) Prior Publication Data

US 2007/0102565 A1    May 10, 2007

(51) Int. Cl.
B64C 37/02 (2006.01)
B64D 5/00 (2006.01)

(52) U.S. Cl. .......................................................... 244/2
(58) Field of Classification Search ................... 244/2, 244/3, 4 R, 117 R, 75.1
See application file for complete search history.

(56) References Cited

U.S. PATENT DOCUMENTS

| | | | | |
|---|---|---|---|---|
| 2,421,742 A | * | 6/1947 | Buettner | 244/2 |
| 2,780,422 A | * | 2/1957 | Maglio, Jr. | 244/2 |
| 2,863,618 A | * | 12/1958 | Doyle et al. | 244/2 |
| 2,936,966 A | * | 5/1960 | Vogt | 244/2 |
| 3,058,691 A | * | 10/1962 | Eggers et al. | 244/2 |
| 3,070,326 A | * | 12/1962 | Griffith | 244/2 |
| 3,161,373 A | * | 12/1964 | Vogt | 244/2 |
| 3,291,242 A | * | 12/1966 | Tinajero | 180/116 |
| 3,298,633 A | * | 1/1967 | Dastoli et al. | 244/2 |
| 3,999,728 A | * | 12/1976 | Zimmer | 244/140 |
| 4,116,405 A | * | 9/1978 | Bacchi et al. | 244/12.4 |
| 4,356,984 A | * | 11/1982 | Worth et al. | 244/1 TD |
| 4,678,141 A | * | 7/1987 | Sarrantonio | 244/2 |
| 4,802,639 A | * | 2/1989 | Hardy et al. | 244/2 |
| 4,834,324 A | * | 5/1989 | Criswell | 244/158.9 |
| 5,000,398 A | * | 3/1991 | Rashev | 244/2 |

(Continued)

FOREIGN PATENT DOCUMENTS

WO    WO 2005118391 A1 * 12/2005

OTHER PUBLICATIONS

C.E. Anderson, *Aircraft Wingtip Coupling Experiments*, Available at http://www.f84thunderjet.com/pubwingtipcoupling-setp-ccal66-580.i . . . >, dated Oct. 2, 2003.

*Primary Examiner*—Teri Pham Luu
*Assistant Examiner*—Joseph W Sanderson
(74) *Attorney, Agent, or Firm*—Alston & Bird LLP

(57) ABSTRACT

An air vehicle assembly and a corresponding method for launching an air vehicle assembly are provided, along with corresponding control systems and methods. The air vehicle assembly may include a plurality of air vehicles releasably joined to one another during a portion of the flight, such as during take-off and landing. By being releasably joined to one another, such as during take-off and landing, the air vehicles can rely upon and assist one another during the vertical take-off and landing while being designed to have a greater range and higher endurance following the transition to forward flight, either while remaining coupled to or following separation from the other air vehicles. By taking into account the states of the other air vehicles, the control system and method also permit the air vehicles of an air vehicle assembly to collaborate.

13 Claims, 5 Drawing Sheets

U.S. PATENT DOCUMENTS

| | | |
|---|---|---|
| 5,245,927 A * | 9/1993 | Ranes .................... 102/378 |
| 5,295,642 A * | 3/1994 | Palmer ....................... 244/2 |
| 5,465,923 A * | 11/1995 | Milner ....................... 244/2 |
| 5,564,648 A * | 10/1996 | Palmer ....................... 244/2 |
| 5,740,985 A * | 4/1998 | Scott et al. ................ 244/2 |
| 6,360,994 B2 * | 3/2002 | Hart et al. ............. 244/171.3 |
| 6,446,905 B1 * | 9/2002 | Campbell et al. ........... 244/2 |
| 6,575,406 B2 * | 6/2003 | Nelson .................... 244/119 |
| 6,591,169 B2 | 7/2003 | Jones et al. |
| 6,612,522 B1 * | 9/2003 | Aldrin et al. ................ 244/2 |
| 6,641,082 B2 * | 11/2003 | Bevilaqua et al. .......... 244/2 |
| 6,711,476 B2 | 3/2004 | Jones et al. |
| 6,814,330 B2 | 11/2004 | Jones et al. |
| 6,869,042 B2 * | 3/2005 | Harrison .................... 244/2 |
| 2005/0067524 A1 * | 3/2005 | Johansen ................... 244/3 |

* cited by examiner

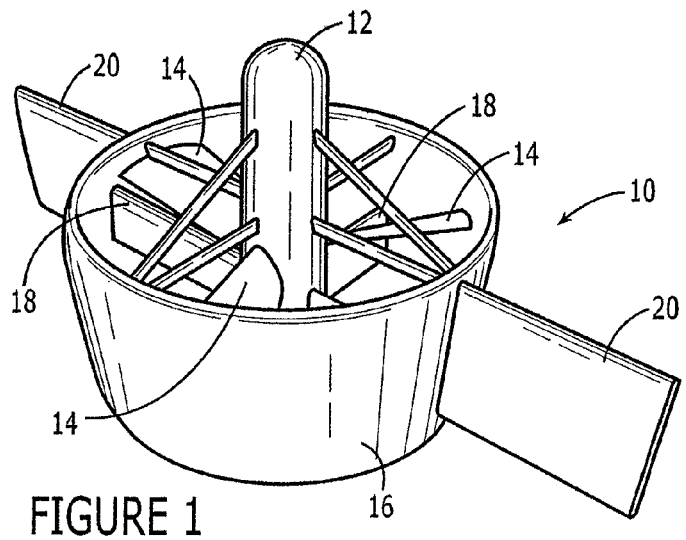
FIGURE 1
(PRIOR ART)
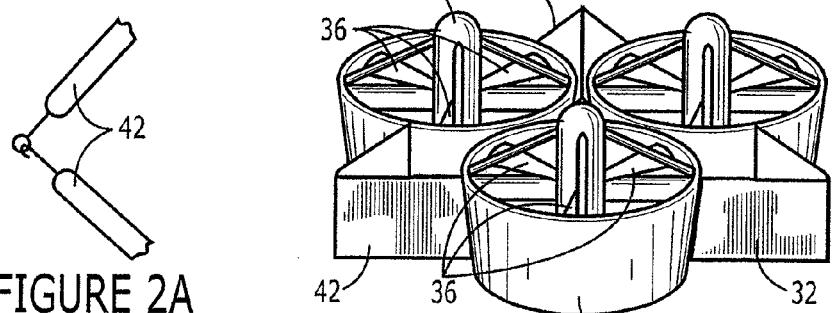
FIGURE 2A
FIGURE 2
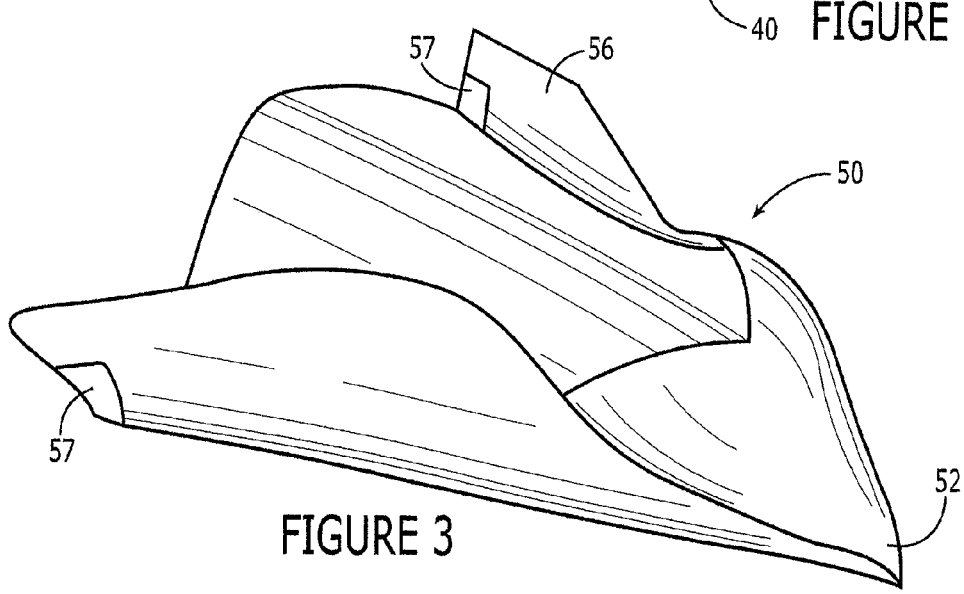
FIGURE 3

AIR VEHICLE ASSEMBLY AND AN ASSOCIATED CONTROL SYSTEM AND METHOD

FIELD OF THE INVENTION

The present invention relates generally to air vehicles and, more particularly, to air vehicles that are capable of being releasably joined to other air vehicles as well as an associated control system and method.

BACKGROUND OF THE INVENTION

Unmanned air vehicles (UAVs) are becoming increasingly prevalent and the performance requirements desired of UAVs are similarly increasing. In this regard, it is desired that UAVs have a long range and high endurance in order to carry out operations far from their base. Additionally, it is desirable for some UAVs to be capable of being launched from and recovered off of relatively small ships. Still further, it is desirable for the speed of UAVs to be increased while the signature of the UAVs is decreased such that UAVs become more survivable.

While UAVs that are capable of a conventional take-off and landing have been developed, some applications demand a vertical take-off and landing capability, such as those applications in which the UAV is to be launched from a relatively small ship. One type of UAV that is capable of vertical take-off and landing is a ducted fan, tail-sitting UAV, also known as Coléoptéres with one example being shown in FIG. 1. The ducted fan UAV 10 includes a central pod 12 that houses an engine. The engine, in turn, drives a propeller 14 for propulsion and vertical lift, such as during vertical take-off and landing. The propeller is housed within a shroud 16 that augments the thrust for take-off. Additionally, the ducted fan UAV includes one or more vanes 18 in the exhaust flow to control the vehicle in pitch, yaw and roll. In operation, the ducted fan UAV is capable of vertical take-off. Following take-off, the ducted fan UAV can transition to forward flight during which the shroud serves as a ring wing. In order to extend the wing span to provide for a longer range, the ducted fan UAV may also include wing extensions 20 extending radially outward from opposed sides of the shroud.

The ducted fan UAV 10 of FIG. 1 has a relatively high speed in comparison to a helicopter of comparable size. However, the ducted fan UAV is not particularly survivable and generally has a larger radar cross section and acoustic signature than desired. In addition, the range of the ducted fan UAV is inferior to a fixed wing UAV as a result of its relatively short wing span. In this regard, the relatively short span of the duct translates into greater drag and correspondingly shorter range in comparison to a comparable fixed wing UAV that is designed for a more conventional take-off and landing. The range and signature of the ducted fan UAV is also impaired by the inclusion of substantial control electronics as are required to provide three-axis control of the ducted fan UAV while in a hovering position.

Accordingly, while UAVs and, more particularly, UAVs capable vertical take-off and landing have been developed, it would be desirable to increase the range and the endurance of these UAVs to permit operation of the UAVs in theaters further removed from their base. Additionally, it would be desirable to develop UAVs, such as UAVs capable of vertical take-off and landing, that can be launched from and recovered off of relatively small ships so as to increase the scenarios in which the UAVs can be deployed.

BRIEF SUMMARY OF THE INVENTION

An air vehicle assembly and a corresponding method for launching an air vehicle assembly are provided, along with corresponding control systems and methods which address at least some of the drawbacks identified above with respect to conventional UAVs, such as those UAVs capable of vertical take-off and landing. In one aspect of this invention, an air vehicle assembly is provided that may include a plurality of air vehicles, such as three or more air vehicles, that are releasably joined to one another during a portion of the flight, such as during take-off and landing. The air vehicle assembly of this aspect may permit the individual air vehicles to have a greater range and higher endurance than at least some comparable UAVs that are similarly designed for vertical take-off and landing. In this regard, the plurality of air vehicles that are releasably joined to one another, such as during take-off and landing, can rely upon and assist one another during the vertical take-off and landing while being designed to have a greater range and higher endurance following the transition to forward flight, either while remaining coupled to or following separation from the other air vehicles.

In one embodiment, an air vehicle assembly is provided that is capable of vertical take-off and includes at least three air vehicles, such as UAVs, that are each releasably joined to at least two of the other air vehicles such that the air vehicles collectively define a closed structure. In one embodiment, each air vehicle includes an engine, a propeller rotatively driven by the engine and at least one vane disposed in the exhaust of the propeller. Each air vehicle may also include a shroud surrounding the propeller. Additionally, a pair of wings, such as cropped delta wings, may extend outwardly from opposite sides of the propeller to respective wing tips. In one embodiment, adjacent air vehicles are releasably joined to one another at their respective wing tips.

In addition to the air vehicles, the air vehicle assembly of this embodiment also includes a control system for at least partially controlling operation of the air vehicles. In this regard, the control system directs the air vehicles to take-off while the air vehicles are releasably joined. For example, the control system may direct the air vehicles to vertically take off while the air vehicles are joined in a manner to define the closed structure. The control system thereafter causes at least two air vehicles that were releasably joined to one another during take-off to decouple. For example, the control system may direct the air vehicles to transition to a line abreast configuration once at least two air vehicles have decoupled. Further, the control system may cause each air vehicle in the line abreast configuration to decouple from each neighboring air vehicle such that each air vehicle is subsequently capable of flight independent of the other air vehicles. For example, the air vehicles may decouple from one another for flight to different targets or to perform different operations in the same vicinity. The control system may also cause the air vehicles to re-couple to one another once each air vehicle has been flown independently of the other air vehicles, such as during the return flight to base or during landing.

The control system may be distributed between the air vehicles with each air vehicle including that portion of the control system that directly controls the respective air vehicle. In this embodiment, those portions of the control system resident in different air vehicles are adapted to communicate with one another while the air vehicles are joined to each other. The control system is capable of controlling various control effectors, such as the vane(s) disposed in the exhaust of the propeller, and/or the engine that is capable of providing differential thrust such that the flight of the air vehicle is at least partially controlled. In embodiments in which the wing include an elevon, the control system may also control the elevon(s) for further controlling the flight of the air vehicle.

In operation, the air vehicle assembly may be formed by initially releasably joining each air vehicle to at least two other air vehicles such that the air vehicles collectively define a closed structure. In one embodiment, each air vehicle may be releasably joined to at least one other air vehicle by releasably joining the air vehicles at their respective wing tips. Once the air vehicles have been releasably joined to define the air vehicle assembly, the air vehicles may take off, such as in a vertical manner. Once airborne, at least two air vehicles may be de-coupled. In one embodiment, the air vehicles may then be transitioned to a line abreast configuration. The transition to the line abreast configuration may occur while the air vehicles are hovering and prior to forward flight or, alternatively, while in forward flight. Following flight in the line abreast configuration, each air vehicle may be decoupled from each neighboring air vehicle such that each air vehicle may be separately flown independent of the other air vehicles. In one embodiment, the air vehicles may be re-coupled to one another after each air vehicle is flown independently of the other air vehicles, such as during the return flight to base or during landing.

In another aspect of the present invention, a system, including a processing element, and associated method are provided for controlling a first air vehicle that is adapted to be releasably joined to at least one other air vehicle. According to this aspect of the present invention, the current commanded state of each of a plurality of control effectors of the first air vehicle is determined. The anticipated changes in a plurality of states of the first air vehicle are then determined based upon the current commanded state of each of the plurality of control effectors of the first air vehicle and respective states of the other air vehicle(s). In this regard, the respective states of the other air vehicle(s) are taken into account in the determination of anticipated changes in the plurality of states of the first air vehicle since the air vehicles are joined to one another. Thereafter, the plurality of control effectors of the first air vehicle may be controlled at least partially based upon the differences between the anticipated changes in the plurality of states of the first air vehicle and desired changes in the plurality of states of the first air vehicle. In order to similarly assist the other air vehicles, information regarding the state of the first air vehicle can also be provided to the other air vehicle(s).

In one embodiment, the first air vehicle is adapted to be releasably joined to at least two other air vehicles. In determining the anticipated changes in the plurality of states of the first air vehicle, the current commanded state of each of the plurality of control effectors of the first air vehicle and the respective states of each of the at least two other air vehicles are taken into account.

By forming an air vehicle assembly, the air vehicle assembly of one embodiment can, as a whole, be designed for vertical take-off and landing regardless of whether any of the individual air vehicles could vertically take-off and land on its own. As such, the air vehicles can be designed to have a greater range and higher endurance even if those design modifications would render the air vehicle incapable of vertical take-off and landing by itself so long as the air vehicle in combination with the other air vehicles of the air vehicle assembly are collectively able to vertically take-off and land. Moreover, the capability of flight in the line abreast configuration also effectively extends the range of the air vehicle assembly as opposed to any air vehicle by itself as a result of the wing span when considered on a collective basis. Thus, the air vehicles of embodiments to the present invention may access targets in regions that are further from their base, while still being capable of controlled flight as a result of the control system that factors in the respective states of the other air vehicles while the air vehicles are coupled to one another.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a perspective view of a ducted fan UAV;

FIG. 2 is a perspective view of an air vehicle assembly according to one embodiment of the present invention which includes three air vehicles releasably joined to one another;

FIG. 2A is a schematic representation of a hook and ring for joining adjacent air vehicles;

FIG. 3 is a perspective view of another embodiment of an air vehicle;

DETAILED DESCRIPTION OF THE INVENTION

Figure 4:
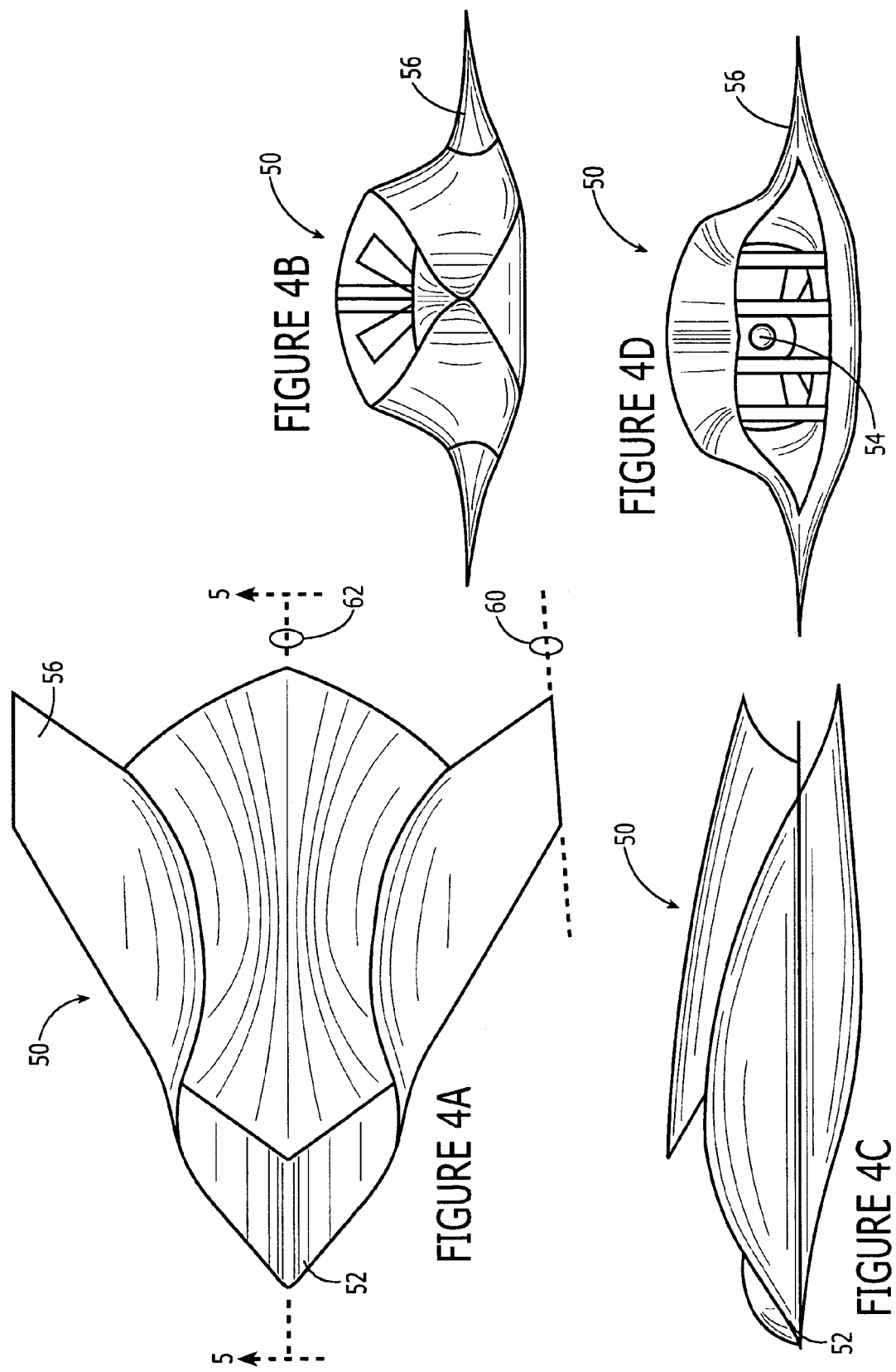
FIGS. 4A-4D are a top plan view, a front view, a side view and a rear view, respectively, of the alternative embodiment of the air vehicle depicted in FIG. 3.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to embodiments of the present invention, an air vehicle assembly is provided that includes a plurality of air vehicles, such as two or more air vehicles, with each air vehicle being releasably joined to another air vehicle. The air vehicle assembly also includes a control system for at least partially controlling operation of the air vehicles such that the air vehicles can take off, vertically or otherwise, while said air vehicles are releasably joined to one another, such as in a line-abreast configuration, a closed configuration or some other configuration.

An air vehicle assembly 30 according to one embodiment of the invention is depicted in FIG. 2. Although the air vehicle assembly could include any number of air vehicles, the air vehicle assembly of this embodiment includes three air vehicles 32 with each air vehicle being releasably joined to the other two air vehicles. As a result of the joinder of the air vehicles to one another, the air vehicles of this embodiment collectively define a closed structure, such as a triangular structure in the embodiment of FIG. 2. While the air vehicle assembly may include any number of air vehicles, with the range of the air vehicles potentially increasing as more air vehicles are coupled together, the optimum cruise speed of the air vehicle assembly is generally lowered with each additional air vehicle (as explained in detail below) and the kinematics of the air vehicle assembly becomes even more complex with each additional air vehicle. Additionally, the probability of any one of the air vehicles failing, thereby potentially causing the entire air vehicle assembly to fail, increases with each additional air vehicle. Thus, an air vehicle assembly comprised of three air vehicles may be desirable in many embodiments.

As shown in the embodiment of FIG. 2, each air vehicle 32 is typically identical to the other air vehicles, although the air vehicles could be of different design if so desired. In the embodiment of FIG. 2, for example, each air vehicle is a ducted fan UAV, such as generally of the type depicted in FIG. 1 and known as a ducted fan Coléoptéres. In this regard, the ducted fan UAV includes a central pod 34 in which a engine is disposed and a propeller 36 that extends radially outward from the central pod and is driven by the engine to rotate relative to the central pod. The ducted fan UAV also includes vanes in the exhaust flow that assist in controlling the air vehicle in pitch, yaw and roll. Further, the ducted fan UAV includes a shroud 40 that augments the thrust for take-off and serves as a ring wing after transition to forward flight. The ducted fan UAV also includes wing extensions 42 extending outwardly from opposed sides of the shroud to respective wing tips. The wing extensions increase the range of the ducted fan UAV and permit neighboring air vehicles to be releasably joined to one another.

In one embodiment, the wing tips of the air vehicles 32 are designed to releasably engage a wing tip of a neighboring air vehicle. The air vehicles may be designed so as to engage one another in various manners. In one embodiment depicted in FIG. 2A in which the air vehicle includes first and second wings extending outwardly from the shroud 40 in opposed directions, one wing tip may include a hook, such as a forwardly facing hook relative to the anticipated direction of forward flight of the ducted fan UAV, while the other wing tip may include a corresponding ring. Thus, the forward facing hook carried by one wing tip of a first air vehicle may engage the ring carried by a wing of a second air vehicle so as to releasably couple the neighboring air vehicles to one another. The neighboring air vehicles may be releasably joined to one another in a variety of other manners, including the joinder of interlocking fingers carried by the wing tips of adjacent air vehicles or the like. In addition to or instead of the mechanical interconnections described above, neighboring air vehicles may be releasably coupled by magnetic attraction, such as provided by electromagnets carried by the wing tips of the air vehicles.

As described below, the ducted fan UAVs 32 of FIG. 2 have independent control about all three axes while hovering. However, while the air vehicles are joined in the closed structure, such as a triangular configuration, each air vehicle need only be capable of providing yaw thrust vectoring by vane deflection. In this manner, yaw, pitch and roll moments can be produced for the air vehicle assembly 30 by the coordinated use of the vanes of each of the air vehicles. As a result, an air vehicle assembly in which multiple air vehicles are releasably joined to define a closed structure may be capable of vertical take-off and landing even though the individual air vehicles are of a more conventional configuration that may not be individually capable of vertically taking off and landing. In one embodiment, however, each air vehicle would have a thrust-to-weight ratio of 1.15 or greater, be capable of providing yaw thrust vectoring and have aerodynamic control surfaces for pitch and roll control. Although the aerodynamic surfaces will not be effective for pitch and roll control while the air vehicle assembly is hovering, the aerodynamic surfaces will not be required while hovering because of the joined vehicle configuration.

Figure 5:
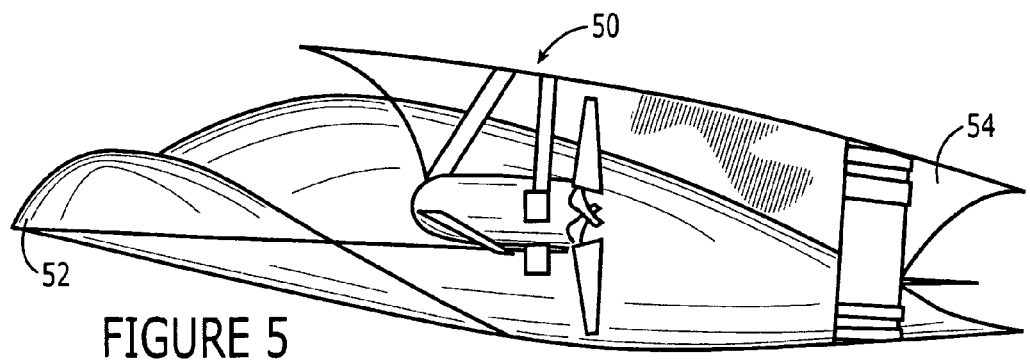
FIG. 5 is a cross-sectional view of the alternative embodiment of the air vehicle of FIG. 3 taken along line 5-5 of FIG. 4A.

Thus, while an air vehicle assembly 30 may be comprised of a plurality of ducted fan Coléoptéres 32 as shown in FIG. 2, the individual air vehicles may have other designs. As another example, the air vehicle assembly may include the plurality of air vehicles 50 of the type depicted in FIG. 3. Although not necessary, the inlet, throat and exit areas of the air vehicle depicted in FIG. 3 may be sized to be the same as a corresponding ducted fan UAV of the type depicted in FIGS. 1 and 2. As best shown in the top, front, side and rear views of FIGS. 4A-4D, respectively, and the cross-sectional side view of FIG. 5, however, the duct has been lengthened to form a serpentine inlet and a nose 52 has been added to at least partially conceal the fan, particularly from lower aspect angles. As with the air vehicle 32 of FIGS. 1 and 2, the air vehicle of FIGS. 3-5 includes vanes 54 disposed within the nozzle to provide yaw thrust vectoring and structural support. In order to obtain the same degree of yaw thrust vectoring and structural support, the air vehicle in FIGS. 3-5 need not include as many vanes as those required by the ducted fan Coléoptéres of FIGS. 1 and 2. In this regard, each UAV of FIGS. 3-5 may include a single vane in comparison to a comparable ducted fan Coléoptéres which may each include three or more vanes. In comparison to the ducted fan UAVs of FIGS. 1 and 2, the UAV of FIGS. 3-5 generally has cropped delta wings 56 that have a greater wing span and a greater wing area to further improve its range. The UAV of FIGS. 3-5 also has sharp, swept leading edges that tend to produce stable vortices at high angles of attack for predictable transition aerodynamics. Each wing of the UAV may also include an elevon 57 for pitch and roll control in forward flight as shown schematically, for example, in FIG. 3.

Figure 6:
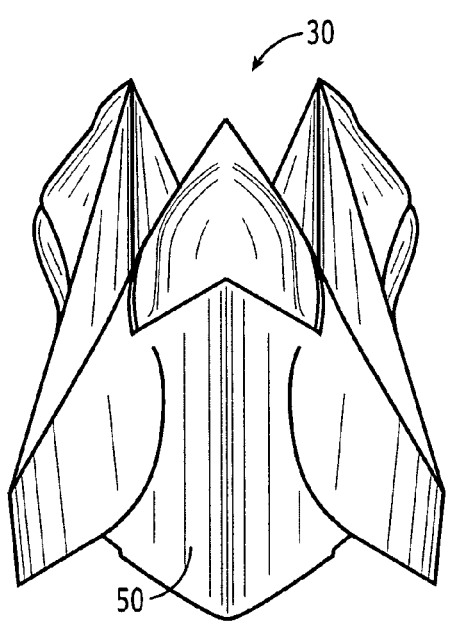
FIG. 6 is a perspective view of an air vehicle assembly of an alternative embodiment which includes three air vehicles of the type depicted in FIG. 3 releasably coupled to one another at their respective wing tips.

As shown in FIG. 6, the UAVs 50 of the alternative embodiment of FIGS. 3-5 may again be joined to one another to collectively define a closed structure. As described in conjunction with the embodiment of the air vehicle assembly 30 depicted in FIG. 2, the air vehicles of FIGS. 3-5 may be designed to releasably couple to neighboring UAVs at their respective wing tips. This releasable coupling may be accomplished in a wide variety of different manners including those techniques described above in conjunction with the embodiment of FIG. 2. While the individual UAVs of this embodiment may or may not be capable of vertical take-off and landing on an individual basis, the air vehicle assembly 30 of this embodiment is also capable of vertical take-off and landing in the assembled state.

By releasably joining the air vehicles 32, 50 of either embodiment, such as at their wing tips, for example, the resulting air vehicle assembly 30 is more compact and rigid and affords considerable analytic redundancy for permitting enhanced control of the air vehicle assembly as opposed to the control afforded individually by any one of the air vehicles. In this regard, during vertical take-off and landing, moments may be generated in pitch and roll through both vane deflection and differential thrust control. Moments about all three axes can also be generated by a number of different combinations of vane deflection. Further, coordinated use of both vane deflection and differential thrust control can produce direct side forces without changing the attitude of the air vehicle assembly; a maneuver which a single ducted fan Coléoptéres is unable to perform.

Figure 7:
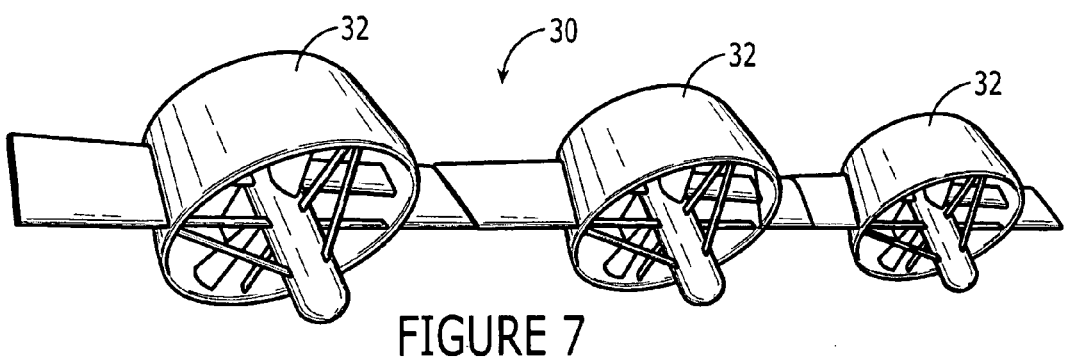
FIG. 7 is a perspective view of the air vehicle assembly of FIG. 2 following a transition to a line abreast configuration.
Figure 8:
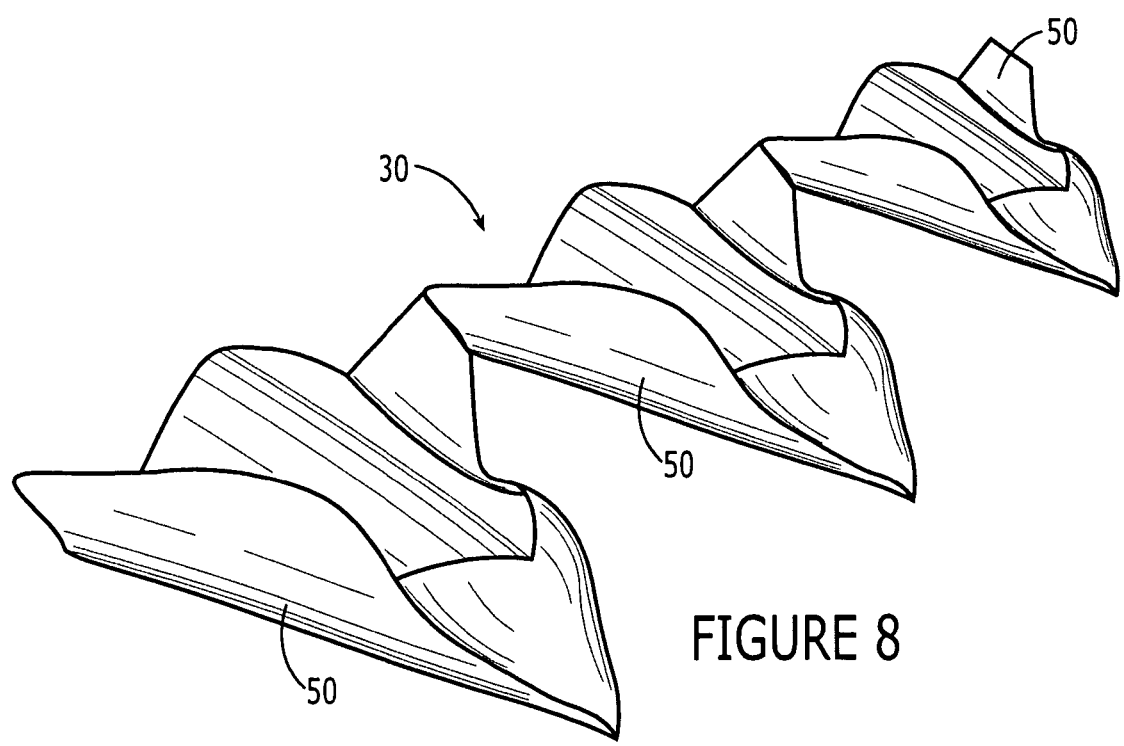
FIG. 8 is a perspective view of the air vehicle assembly of FIG. 6 following a transition to a line abreast configuration.

Following take-off of the air vehicle assembly 30, one of the releasable joints that previously connected two of the air vehicles 32, 50, such as at their wing tips, may be released and the air vehicle assembly may unfold to a line-abreast configuration as shown in FIG. 7 in conjunction with the air vehicle assembly of FIG. 2 and FIG. 8 in conjunction with the air vehicle assembly of FIG. 6. This transition to a line abreast configuration may be performed either prior to or following the transition to forward flight. If the air vehicle assembly 30 were unfolded while hovering prior to transitioning to forward flight, the control system described below would utilize the capability of each air vehicle to individually control itself with respect to all three axes. Following the unfolding into the line abreast configuration, the transition to forward flight would then be identical to that of the Heliwing UAV. Alternatively, if the air vehicle assembly were unfolded while in forward flight, the transition from hovering to forward flight will be conducted while the air vehicles continue to define the closed structure and should be similar to that of a single ducted fan. Once in forward flight, the unfolding process would be similar to the flight dynamics required to maintain the vehicles in position for cruise flight as described below.

More particularly with respect to the embodiment of FIG. 6, the vane(s) 54 in the nozzle provide the requisite yaw thrust vectoring during the vertical take-off and landing and while hovering. In this regard, while joined to one another in the closed structure of the air vehicle assembly 30, the vane(s) of the air vehicles 52 provide high bandwidth (i.e., fast) pitch, roll, and yaw moments while hovering. In addition, thrust modulation that is provided by each of the plurality of air vehicles provides heave control and low bandwidth (i.e., slow) pitch and yaw moments while hovering. As described below, the control systems of each of the air vehicles work together during vertical take-off and landing and while hovering to provide optimal control taking advantage of the analytic redundancy inherent in the air vehicle assembly.

Following vertical take-off, the connection of two neighboring air vehicles 52 may be released and the air vehicles may transition to a line-abreast configuration as shown in FIG. 8, either prior to the transition to forward flight or during forward flight. The air vehicles can quickly separate from one another by releasing the connections that otherwise join the neighboring air vehicles, such as at their wing tips, and then fly independently of one another to their respective targets. Alternatively, the air vehicles may remain releasably connected in the line-abreast configuration during flight to a common target region since the increased span provided by the joined configuration provides an increase in the range of the air vehicle assembly 30. During forward flight, the elevons provide pitch and roll control, while vane deflection provides yaw control.

In one embodiment, the wing tip defines the releasable connection with the neighboring air vehicle 52 and therefore the hinge line about which an air vehicle moves with respect to its neighboring air vehicles. As opposed to constructing the air vehicle such that the wing tip, that is, the hinge line, extends parallel to the longitudinal axis defined by the air vehicle, the hinge line at the wing tip may be configured to tow out the nose of the outboard vehicles (the leftmost and rightmost vehicles in the line abreast configuration) by a few degrees. This configuration is depicted, for example, in the top plan view of FIG. 4A in which the hinge line 60 is disposed at an angle with respect to the longitudinal axis 62. By configuring the hinge line to tow out the nose of the outboard air vehicles by a few degrees, a natural roll-pitch coupling is provided that aides in stabilizing the air vehicles during cruise flight.

Even if the air vehicles remain connected during cruise flight, the air vehicles 32, 50 of either embodiment generally disconnect from one another once in the target region. Following execution of the mission, the air vehicles may return to base individually with the air vehicles of the embodiment of FIG. 2 being capable of vertical landing on an individual basis, and the air vehicles of the embodiment of FIGS. 3-6 being capable of a conventional landing. Alternatively, the air vehicles may rejoin one another in a line abreast configuration, such as by releasably connecting to the neighboring air vehicle, following completion of the mission for the return flight to the base, thereby further extending the range of the air vehicles. Following the return to the base, the air vehicles may transition from the line abreast configuration that was assumed during cruise flight to the closed structure, such as a triangular configuration, for vertical landing.

The various control effectors are advantageously utilized in a coordinated fashion with the use made of the various control effectors changing as the configuration of the air vehicle assembly and the individual air vehicles 32, 50 changes as mentioned above, such as to facilitate the vertical take-off and landing of the air vehicle assembly 30, the unfolding of the air vehicle assembly into a line abreast configuration and the transition from hovering to forward flight in one embodiment. In order to coordinate the use of the various control effectors in the various configurations of the air vehicle assembly, a control system and method that generally implements a non-linear mixer structure, such as the embodiment depicted in FIG. 9, is provided according to another aspect of the invention.

A control method and system are therefore also provided for controlling the plurality of control effectors of the air vehicles 32, 50. As described above, the air vehicles have a wide variety of control effectors including aerodynamic surfaces, such as the shroud, vanes and elevons, and engine thrust variations.

As described below, the control system and method of this aspect of the present invention integrate the control of these various control effectors, including the aerodynamic surfaces and thrust variations, to provide control during all phases of flight. Moreover, the control method advantageously utilizes the various types of control effectors differently during different stages of flight based, at least in apart, upon the effect occasioned by changes in the various control effectors at the current flight conditions. In addition, the control system and method takes into account the effect of the other air vehicles while connected in a closed configuration such that the air vehicles work in collaboration as opposed to fighting one another.

Figure 9A:
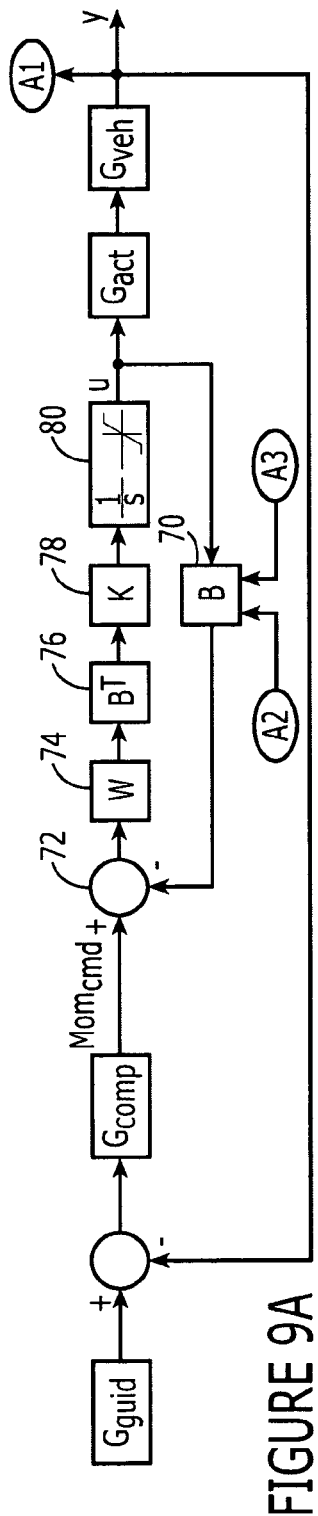
FIGS. 9A-9C are block diagrams illustrating the operations performed by the control system and method for first, second and third air vehicles, respectively, in accordance with one embodiment of the present invention.
Figure 9B:
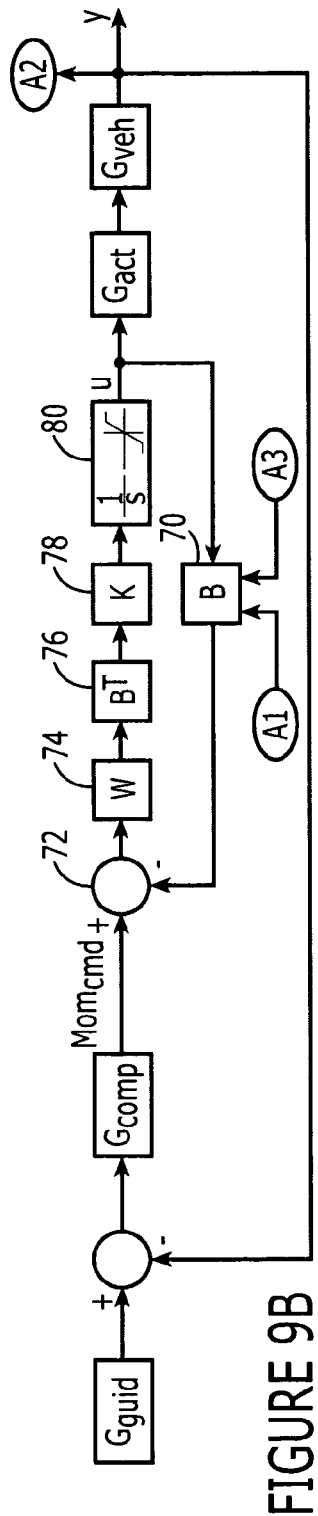
Figure 9C:
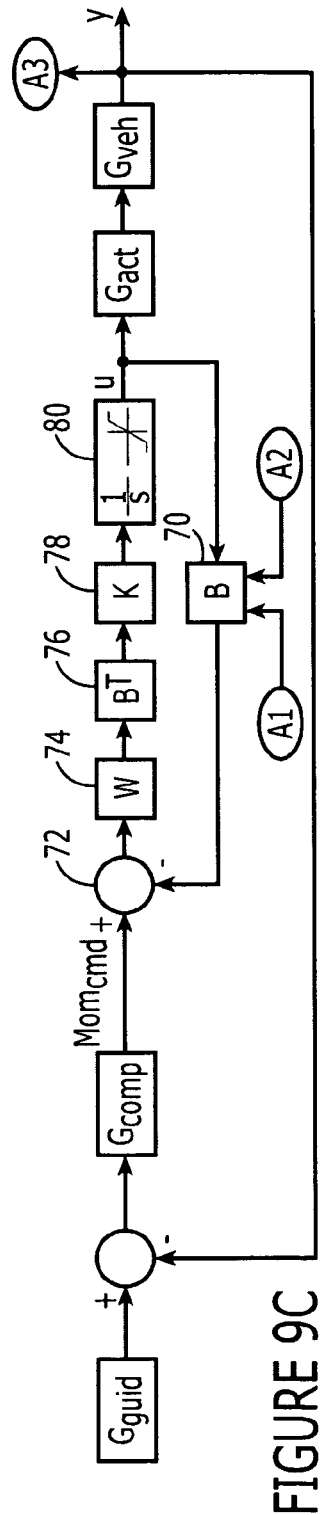

As shown in FIG. 9 and described hereinafter, the control system and method may be implemented in the discrete domain utilizing digital signals. Alternatively, the control method may be implemented in the continuous domain utilizing analog signals if so desired. Regardless of the domain in which the control system and method is implemented, the control system and method depicted in FIG. 9 is automated and is generally implemented by means of a computer, such as a flight control computer or the like. As such, the control system and method is typically embodied in a computer program product which directs the flight control computer to issue appropriate commands to the plurality of control effectors in order to control the air vehicle as desired. Moreover, a comparable control method is generally employed for each air vehicle 32, 50 of an air vehicle assembly 30 with the control system and method of the first, second and third air vehicles being presented in FIGS. 9A-9C, respectively. For purposes of example, the control system and method of a first air vehicle will be described below in conjunction with FIG. 9A.

As shown, the current commands u issued to the control effectors are monitored. The current commands u define the current state to which each control effector has been commanded. For example, the commands associated with an aerodynamic surface such as a vane or elevon define the position to which the respective aerodynamic surface is currently being directed to assume. Similarly, commands may be issued to the engine to define the thrust to be generated. Typically, the current commands are represented by a vector u which includes a term defining the state to which each respective control effector is currently commanded.

Based upon the current control effector commands u and the states of the other air vehicles (designated A2 and A3 in FIG. 9A), the anticipated changes in the plurality of states of the air vehicle are determined. In this regard, an air vehicle that is in flight has a number of states y, including the angle of attack, the angle of side slip, the air speed, the vehicle attitude, the lift, the altitude and the like. In addition, the states of an air vehicle that are considered by the control system and method may also include a plurality of engine parameters, such as temperature, pressure, total area and the like. As known to those skilled in the art, the states of an air vehicle may vary somewhat depending upon the type of air vehicle, but are well defined for a respective type of air vehicle.

In order to determine the anticipated changes in the system rate of change of the state vector of the air vehicle based upon the current commands u and the states of the other air vehicles A2 and A3, a matrix B may be defined that represents changes in the rate of change of the respective states (hereinafter termed the state rates) of the air vehicle in response to changes in the plurality of control effectors and the states of the other air vehicles A2 and A3. See block 70 of FIG. 9A. The matrix includes a plurality of terms with each term representing the change in a respective state rate of the air vehicle in response to the change of a respective control effector or a respective state of one of the other air vehicles. As such, the matrix represents the manner in which the air vehicle is anticipated to respond to changes in the control effectors and changes in the state of the other air vehicles. Typically, the matrix is constructed to have a plurality of rows and a plurality of columns. Each column generally includes a plurality of terms, each of which defines the anticipated change in a respective state rate of the air vehicle in response to the change in the same control effector or the same state of a respective one of the other air vehicles.

Thus, each column of the matrix represents the anticipated changes in the state rates of the air vehicle due to a change of a respective control effector or a respective state of one of the other air vehicles.

The matrix B may be constructed as a result of experiments or numerical calculations. In this technique, the current states of each air vehicle and the current settings of the control effectors are provided. Based upon the current states of the air vehicles and the current settings of the control effectors, the resulting forces and torques acting upon the first air vehicle are determined. By factoring in the mass and inertia of the air vehicle, the state rates may be determined.

In order to determine the resulting forces and torques acting upon the air vehicle, the aerodynamic coefficients for the current flight condition, as defined by the current states of the air vehicle, are determined, as known to those skilled in the art. The resulting forces and torques upon the air vehicle can then be determined based upon the aerodynamic coefficients by means of force buildup equations, also known to those skilled in the art.

The anticipated changes in the state rates of the air vehicle are then determined based upon finite differences. In this regard, one control effector or one state of one of the other air vehicles is considered to have varied slightly, such as 1% or less, from its current state and the process of determining the resulting forces and torques acting upon the first air vehicle is repeated, albeit with the state of one control effector or one state of one of the other air vehicles having been varied somewhat. The resulting change in the forces and torques acting upon the first air vehicle following the slight variation of one control effector or one state of one of the other air vehicles are then determined. By factoring out the mass and inertia of the first air vehicle from the force buildup equations representative of the changes in the forces and torques occasioned by a slight variation in one control effectors, the change in each state rate of the first air vehicle attributable to the change in the respective control effector or the respective state of the other air vehicle may be determined, thereby defining one column in the resulting matrix B. The foregoing process of slightly varying a respective control effector or a respective state of one of the other air vehicles and determining the resulting change in forces and torques acting upon the first air vehicle and, correspondingly, the resulting changes in the state rates of the first air vehicle is repeated for each control effector and for each state of the other air vehicles in order to construct the entire matrix.

Alternatively, the matrix B may be determined based upon an analytic calculation. According to this alternative technique, a nonlinear multidimensional analytic curve may be fit to each respective aerodynamic coefficient defined by an aerodynamic database. In this regard, the aerodynamic database separately defines each aerodynamic coefficient at each of a large number of different flight conditions, with a respective flight condition defined by a respective system state vector and the current state of the control effectors and the current states of the other air vehicles. The nonlinear multidimensional curves may be fit to respective aerodynamic coefficients according to any of a variety of techniques. In one embodiment, however, the nonlinear multidimensional curves are fit to respective aerodynamic coefficients. Since the aerodynamic coefficients are now represented by analytic functions, the partial derivatives of each aerodynamic coefficient with respect to a change in a respective control effector or a change in a respective state of one of the other air vehicles may then be readily determined by hand or, more commonly, by utilizing a commercially available symbolic algebra tool or program such as Mathematica. By utilizing the nonlinear multidimensional polynomial curve representing each aerodynamic coefficient, along with dynamic pressure, vehicle mass, inertia, span, reference area and other parameters, the force buildup equations for the first air vehicle may again be constructed as known to those skilled in the art. The partial derivatives of each force with respect to each aerodynamic coefficient may then be determined. By utilizing the chain rule and the partial derivatives of the aerodynamic coefficients with respect to changes in respective control effectors and changes in respective states of the other air vehicles and the partial derivatives of the forces with respect to respective aerodynamic coefficients, the partial derivatives of the forces with respect to changes in respective control effectors and changes in respective states of the other air vehicles may be determined. By factoring out the mass and inertia of the first air vehicle, the partial derivatives of the forces with respect to changes in respective control effectors can be translated into the partial derivatives of the state rates of the first air vehicle with respect to changes in each control effector and each state of each of the other air vehicles. Thereafter, the matrix can be constructed as described above.

Regardless of the manner in which the matrix B is to be constructed, the matrix is preferably determined in real time based upon the current flight conditions including the dynamic pressure and the current control effector commands u of the air vehicle. Following construction of the matrix, the anticipated change in each state rate of the air vehicle is determined by the vector multiplication of the vector u representing the current commands and the matrix. In particular, the dot product of the vector representing the current commands and the matrix is determined.

By taking into account the current flight conditions including, for example, the dynamic pressure and, in turn, the velocity of the air vehicle during the construction of the matrix, the anticipated change in the plurality of state rates is based not only upon the current commanded state of the control effectors and the current states of the other air vehicles, but also the current flight conditions. In this regard, the matrix is constructed such that the anticipated change in each state rate is dominated at each phase of flight by changes in those control effectors that bring about the most substantial change.

As described above, the matrix B takes into account the changes in the states of the other air vehicles. While appropriate during connection of the air vehicle to the other air vehicles, either in a closed configuration or in a line abreast configuration, the control system and method of this aspect of the present invention would not take the states of the other air vehicles into account following the separation of the air vehicle for flight independent of the other air vehicles. During this independent phase of flight, however, the control system and method otherwise operates as described herein, with the only exception being that the states of the other aircraft make no contribution.

The desired state rates of the aerodynamic vehicle are also provided, such as by a guidance algorithm $G_{guid}$, and the difference between the desired state rates and the current state rates y is determined and is provided to the transfer function $G_{comp}$ of the computer that implements the control system and method to produce the change $Mom_{cmd}$ necessary to effect the desired state rates. In order to determine the manner in which the control effectors must be controlled in order to affect the desired change $Mom_{cmd}$ in the respective state rates of the air vehicle, the difference between the anticipated and desired changes in the state rates of the aerodynamic vehicle is determined. Since the desired change $Mom_{cmd}$ in the respective state rates of the air vehicle is also typically represented by a vector, the vector difference between the dot product representing the anticipated change in state rates of the aerodynamic vehicle and the vector representing the desired changes in the state rates is obtained as shown in block 72 of FIG. 9A.

According to one advantageous aspect of the present invention, the difference between the anticipated and desired changes in the state rates of the air vehicle may be weighted based upon a predefined criteria. One predefined criteria defines the relative importance of the respective states of the air vehicle. Thus, the differences between the anticipated and desired changes in the state rates of the air vehicle, typically represented as a vector difference, can be weighted so as to affect changes in some states of the air vehicle more rapidly than other states due to the relative importance of the states for which changes are more rapidly affected. As such, a respective weight may be assigned to each state of the air vehicle, such as during system configuration or the like.

Another predetermined criteria is a predefined penalty that may serve to place lesser or greater emphasis on outlier values. In this regard, the effect of the predefined penalty will vary based upon the magnitude of the difference between the anticipated and desired changes in the respective state rate of the air vehicle, with relatively large differences being considered outliers. For example, small penalties may be assigned to the outliers in those systems that are designed to factor the impact of the outliers into the control process, while large penalties may be assigned to outliers in those systems that desire to deemphasize the contributions of outliers since they may be attributable to an error. Based upon the weights and/or penalties that have been defined, a weighting matrix W may be defined, such as described in more detail in U.S. Pat. No. 6,814,330 to Richard D. Jones, et al., the contents of which are incorporated in their entirety herein.

By multiplying the vector difference between the anticipated and desired changes in the state rates of the air vehicle and the weighting matrix W as shown in block 74, the weighted differences between the anticipated and desired changes in the state rates of the air vehicle are obtained.

These weighted differences between the anticipated and desired changes in the state rates of the air vehicle are then converted to the corresponding changes in the control effectors to bring about the desired changes $Mom_{cmd}$ in the state rates. In the illustrated embodiment, the weighted differences are multiplied by the transpose $B^T$ of the matrix representing the changes in the state rates of the air vehicle in response to the changes in the plurality of control effectors and changes in the states of the other air vehicles as shown in block 76 of FIG. 9A. In other words, the dot product of the weighted vector difference and the transpose of the matrix representing changes in the state rates of the air vehicle in response to changes in the plurality of control effectors and changes in the states of the other air vehicles is determined. As such, the rate of changes ů of the control effectors required to affect the desired changes in the state rates of the air vehicle subject to the anticipated changes in the state rates of the air vehicle based upon the current commanded state of each control effector u and the states of the other air vehicles is determined. Since each term of the vector difference between the anticipated and desired changes in the state rates of the air vehicle has been weighted, the resulting commands to the control effectors to affect the desired change in the state rates of the air vehicle are computed based upon the predetermined criteria, such as the relative importance of the respective states of the air vehicle and/or the weighting to be given to any outlier measurements. By multiplying the weighted differences by the transpose of the matrix representing changes in the state rates of the air vehicle in response to changes in the control effectors and changes in the states of the other air vehicles, the control system and method may employ a gradient descent technique so as to cause the control effectors that will have the greatest impact upon effecting the desired change to be adjusted more than the control effectors that would have less impact upon effecting the desired change, thereby improving the efficiency of the control scheme by using all available effectors in a coordinated fashion.

The rate of changes $\dot{u}$ of the control effectors required to affect the desired changes in the state rates of the aerodynamic vehicle may also be weighted by a gain matrix K as shown by block 78 based upon the relative or perceived importance of the respective control effectors. The gain matrix K is a diagonal, positive, semi-definite matrix with one term of the gain matrix associated with the rate of change of each respective control effector. Typically the values of the gain matrix are selected in advance with values larger than one serving to increase the rate of change of the respective control effector and values less than one serving to decrease the rate of change of the respective control effector.

Since control effectors are typically subject to at least some limitations, such as limitations in the predefined range of the control effector and limitations in the permissible rate of change of the control effector, the system and method of one embodiment limit the permissible change of each control effector that has these predefined limitations such that the resulting commands issued to the control effectors do not attempt to exceed the limitations of the control effectors. Different limitations may be imposed upon different control effectors. For example, the control signals otherwise provided to the control effectors may be limited, such as by a vector limiter as shown in block 80 of FIG. 9A, to prevent the respective control effector from being commanded to change at a rate that exceeds a predefined limit. In this regard, upper and/or lower limits may be predefined such that the permissible rate of change of the respective control effector must remain within the acceptable range bounded by the limit(s). In order to convert the rates of change $\dot{u}$ of the control effectors that have been determined to create the desired change in the state rates and, in turn, the state of the air vehicle into control effector commands, the rates of change are integrated as also represented by 1/S in block 80 of FIG. 9A.

Once the desired changes in the control effectors have been appropriately limited so as to prevent any control effector from being commanded to exceed its predefined limitations, the changes in each control effector that have been determined to affect the desired change in the state rates of the air vehicle are issued as commands to each of the control effectors. Subject to the transfer functions of the actuators and the air vehicle $G_{act}$ and $G_{veh}$, the desired change in the state rates and, in turn, the desired change in the time rate of change of the system state vector y of the air vehicle will be affected.

While the control system and method for a first air vehicle has been described above in conjunction with FIG. 9A, the comparable control system and method is employed by each of the other air vehicles, such as represented by FIGS. 9B and 9C with respect to the second and third air vehicles, respectively. As shown, each air vehicle provides the other air vehicles with its current states (designated A1, A2 and A3 for the first, second and third air vehicles, respectively) such that the other air vehicles can factor the states of the other air vehicles into its control methodology. As such, the individual control systems and methods of the first, second and third air vehicles cooperate to properly control the air vehicle assembly 30 and do not fight or otherwise contend with one another.

Although an air vehicle assembly 30 as described above may provide improved range and endurance relative to a single one of its constituent air vehicles as a result of an improved lift-to-drag ratio, the optimum air speed $V_{opt}$ for the maximum range is slower than the constituent air vehicles individually. Thus, the air vehicle assembly of embodiments of the present invention presents a performance tradeoff between range and endurance on the one hand and speed and, correspondingly, the time required for execution of a mission on the other hand. This tradeoff may be mathematically represented as follows in which the drag D of a single air vehicle is represented as $$D = C_{Do} \cdot \frac{1}{2} \cdot \rho \cdot V^2 \cdot S + \frac{W^2}{\pi \cdot e \cdot b^2 \cdot \frac{1}{2} \cdot \rho \cdot V^2}$$

wherein $C_{Do}$ is the parasite drag coefficient, $\rho$ is air density, V is airspeed, S is wing or reference area, W is weight, and b is reference span. In addition, the Breguet range R and endurance E may be represented as:

$$R = \frac{\eta}{SFC} \cdot \frac{L}{D} \cdot \ln\left(\frac{W_0}{W_1}\right)$$

$$E = \frac{\eta}{SFC} \cdot \frac{C_L^{1.5}}{C_D} \cdot \sqrt{2 \cdot \rho \cdot S} \cdot \left(\frac{1}{\sqrt{W_1}} - \frac{1}{\sqrt{W_0}}\right)$$

wherein SFC is specific fuel consumption, $\eta$ is propulsive efficiency, L is lift, $W_0$ is initial weight, $W_1$ is final weight, $C_L$ is lift coefficient, and $C_D$ is total drag coefficient. The optimum air speed $V_{opt}$ for the maximum range, that is, the maximum L/D, can be determined as follows:

$$\frac{d}{dV}D = \frac{d}{dV}\left(C_{Do} \cdot \frac{1}{2} \cdot \rho \cdot V^2 \cdot S + \frac{W^2}{\pi \cdot e \cdot b^2 \cdot \frac{1}{2} \cdot \rho \cdot V^2}\right)$$

$$\frac{d}{dV}D = C_{Do} \cdot \rho \cdot V \cdot S - 4 \cdot \frac{W^2}{[\pi \cdot [e \cdot [b^2 \cdot (\rho \cdot V^3)]]]}$$

$$V_{opt} = \sqrt{2} \cdot \sqrt{\frac{W}{(\rho \cdot b)}} \cdot \sqrt{\frac{1}{[C_{Do} \cdot (S \cdot (\pi \cdot e))]}}$$

For an air vehicle assembly 30 comprised of three air vehicles releasably joined together, the ratio of the optimum speed $V_{opt3}$ for the maximum range for the air vehicle assembly relative to the optimum air speed $V_{opt}$ for the maximum range of a single constituent air vehicle can be determined as follows:

$$V_{opt3} = \sqrt{2} \cdot \sqrt{\frac{3 \cdot W}{(\rho \cdot 3 \cdot b)}} \cdot \sqrt{\frac{1}{[C_{Do} \cdot (3 \cdot S \cdot (\pi \cdot e))]}}$$

$$\frac{V_{opt3}}{V_{opt}} = \sqrt{\sqrt{\frac{1}{3}}}$$

-continued $$\frac{V_{opt3}}{V_{opt}} = .7599$$

As such, the optimum air speed $V_{opt3}$ for the maximum range for an air vehicle assembly 30 comprised of three air vehicles is less than, such as about 75% of, the optimum air speed $V_{opt}$ for a single one of the constituent air vehicles.

Similarly, comparing the lift-to-drag ratio ($L_3/D_3$) of an air vehicle assembly 30 comprised of three air vehicles relative to the lift-to-drag ratio ($L_1/D_1$) of a single one of the constituent air vehicles can be determined as follows:

$$\frac{D}{L} = \left(C_{Do} \cdot \frac{1}{2} \cdot \rho \cdot V^2 \cdot S + \frac{W^2}{\pi \cdot e \cdot b^2 \cdot \frac{1}{2} \cdot \rho \cdot V^2}\right) \cdot \frac{1}{W}$$

$$\frac{D}{L} = \frac{1}{(2 \cdot W)} \cdot C_{Do} \cdot \rho \cdot V^2 \cdot S + 2 \cdot \frac{W}{(\pi \cdot e \cdot b^2 \cdot \rho \cdot V^2)}$$

$$\frac{D_3}{L_3} = \frac{1}{(2 \cdot 3 \cdot W)} \cdot C_{Do} \cdot \rho \cdot V^2 \cdot 3 \cdot S + 2 \cdot \frac{3 \cdot W}{[\pi \cdot e \cdot (3 \cdot b)^2 \cdot \rho \cdot V^2]}$$

$$\frac{\frac{D_1}{L_1}}{\frac{D_3}{L_3}} = \frac{\left[\frac{1}{(2 \cdot W)} \cdot C_{Do} \cdot \rho \cdot V_1^2 \cdot S + 2 \cdot \frac{W}{(\pi \cdot e \cdot b^2 \cdot \rho \cdot V_1^2)}\right]}{\left[\frac{1}{(2 \cdot 3 \cdot W)} \cdot C_{Do} \cdot \rho \cdot V_3^2 \cdot 3 \cdot S + 2 \cdot \frac{3 \cdot W}{[\pi \cdot e \cdot (3 \cdot b)^2 \cdot \rho \cdot V_3^2]}\right]}$$

When flying at the optimum speed for each configuration, that is, $V_{opt3}$ for the air vehicle assembly 30 and $V_{opt}$ for a single air vehicle, the lift-to-drag ratio ($L_3/D_3$) of the air vehicle assembly relative to the lift-to-drag ration ($L_1/D_1$) of a single one of the air vehicles may be determined as follows:

$$\frac{\frac{D_1}{L_1}}{\frac{D_3}{L_3}} = \frac{\left[\frac{1}{(2 \cdot W)} \cdot C_{Do} \cdot \rho \cdot \left[\sqrt{2} \cdot \sqrt{\frac{W}{(\rho \cdot b)}} \cdot \sqrt{\frac{1}{[C_{Do} \cdot (S \cdot (\pi \cdot e))]}}\right]^2 \cdot S \ldots + 2 \cdot \frac{W}{\pi \cdot e \cdot b^2 \cdot \rho \cdot \left[\sqrt{2} \cdot \sqrt{\frac{W}{(\rho \cdot b)}} \cdot \sqrt{\frac{1}{[C_{Do} \cdot (S \cdot (\pi \cdot e))]}}\right]^2}\right]}{\left[\frac{1}{(2 \cdot 3 \cdot W)} \cdot C_{Do} \cdot \rho \cdot \left[\sqrt{2} \cdot \sqrt{\frac{3 \cdot W}{(\rho \cdot 3 \cdot b)}} \cdot \sqrt{\frac{1}{[C_{Do} \cdot (3 \cdot S \cdot (\pi \cdot e))]}}\right]^2 \cdot 3 \cdot S \ldots + 2 \cdot \frac{3 \cdot W}{\pi \cdot e \cdot (3 \cdot b)^2 \cdot \rho \cdot \left[\sqrt{2} \cdot \sqrt{\frac{3 \cdot W}{(\rho \cdot 3 \cdot b)}} \cdot \sqrt{\frac{1}{[C_{Do} \cdot (3 \cdot S \cdot (\pi \cdot e))]}}\right]^2}\right]}$$

-continued $$\frac{\frac{D_1}{L_1}}{\frac{D_3}{L_3}} = \sqrt{3}$$

$$\frac{\frac{L_3}{D_3}}{\left(\frac{L_1}{D_1}\right)} = 1.732$$

This same ratio may be similarly determined with both the air vehicle assembly and a single air vehicle flying at the optimum air speed $V_{opt}$ for the maximum range of the single air vehicle as follows:

$$\frac{\frac{D_1}{L_1}}{\frac{D_3}{L_3}} = \frac{\left[\frac{1}{(2 \cdot W)} \cdot C_{Do} \cdot \rho \cdot V^2 \cdot S + 2 \cdot \frac{W}{(\pi \cdot e \cdot b^2 \cdot \rho \cdot V^2)}\right]}{\left[\frac{1}{(2 \cdot 3 \cdot W)} \cdot C_{Do} \cdot \rho \cdot V^2 \cdot 3 \cdot S + 2 \cdot \frac{3 \cdot W}{[\pi \cdot e \cdot (3 \cdot b)^2 \cdot \rho \cdot V^2]}\right]}$$

$$\frac{\frac{L_3}{D_3}}{\left(\frac{L_1}{D_1}\right)} = \frac{3}{2}$$

This process can be extended to air vehicle assemblies 30 comprised of additional air vehicles with the lift-to-drag ratio ($L_5/D_5$) of an air vehicle assembly comprised of five air vehicles flying at the optimum speed $V_{opt5}$ for its maximum range compared to the lift-to-drag ratio ($L_1/D_1$) a single one of the constituent air vehicles flying at the optimum speed $V_{opt}$ for its maximum range, determined as follows:

$$\frac{\frac{D_1}{L_1}}{\frac{D_5}{L_5}} = \frac{\left[\frac{1}{(2 \cdot W)} \cdot C_{Do} \cdot \rho \cdot V^2 \cdot S + 2 \cdot \frac{W}{(\pi \cdot e \cdot b^2 \cdot \rho \cdot V^2)}\right]}{\left[\frac{1}{(2 \cdot 5 \cdot W)} \cdot C_{Do} \cdot \rho \cdot V^2 \cdot 5 \cdot S + 2 \cdot \frac{5 \cdot W}{[\pi \cdot e \cdot (5 \cdot b)^2 \cdot \rho \cdot V^2]}\right]}$$

$$\frac{\frac{L_5}{D_5}}{\left(\frac{L_1}{D_1}\right)} = \frac{\left[\frac{C_{Do}}{b} \cdot \sqrt{\frac{1}{[C_{Do} \cdot (S \cdot (\pi \cdot e))]}} \cdot S + \frac{1}{\left[\pi \cdot \left[e \cdot \left[b \cdot \sqrt{\frac{1}{[C_{Do} \cdot (S \cdot (\pi \cdot e))]}}\right]\right]\right]}\right]}{\left[\frac{C_{Do}}{b} \cdot \sqrt{\frac{1}{[C_{Do} \cdot (S \cdot (\pi \cdot e))]}} \cdot S + \frac{1}{\left[5 \cdot \left[\pi \cdot \left[e \cdot \left[b \cdot \sqrt{\frac{1}{[C_{Do} \cdot (S \cdot (\pi \cdot e))]}}\right]\right]\right]\right]}\right]}$$

$$\frac{\frac{L_5}{D_5}}{\left(\frac{L_1}{D_1}\right)} = \frac{5}{3}$$

-continued $$\frac{\frac{L_5}{D_5}}{\left(\frac{L_1}{D_1}\right)} = 1.667$$

As seen from a comparison of foregoing equations, the lift-to-drag ratio of an air vehicle assembly comprised of a greater number of air vehicles is actually further reduced such that the range is correspondingly improved.

While the air vehicle assembly 30 of embodiments of the present invention presents a performance tradeoff between range and endurance on the one hand and speed and, correspondingly, the time required for execution of a mission on the other hand, embodiments of the air vehicle assembly and associated control system and method offer a number of advantages. In one embodiment, for example, the air vehicle assembly as a whole can be designed for vertical take-off and landing regardless of whether any of the individual air vehicles could vertically take-off and land on its own. As such, the air vehicles can be designed to have a greater range and higher endurance even if those design modifications would render the air vehicle incapable of vertical take-off and landing by itself so long as the air vehicle in combination with the other air vehicles of the air vehicle assembly are collectively able to vertically take-off and land. Moreover, the capability of flight in the line abreast configuration also effectively extends the range of the air vehicle assembly as opposed to any air vehicle by itself as a result of the wing span when considered on a collective basis. Thus, the air vehicles of embodiments to the present invention may access targets in regions that are further from their base, while still being capable of controlled flight as a result of the control system that factors in the respective states of the other air vehicles while the air vehicles are coupled to one another.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An air vehicle assembly comprising:
at least three air vehicles, wherein each air vehicle is releasably joined to another air vehicle; and
a control system for at least partially controlling operation of said air vehicles, wherein said control system directs said air vehicles to take off while said air vehicles are releasably joined to one another such that said air vehicles collectively define a closed structure during take off, and wherein said control system directs at least two of said air vehicles that were releasably joined to one another during take off to decouple from one another while each remains coupled to at least one other air vehicle during a transition to a line abreast configuration.

2. An air vehicle assembly according to claim 1 wherein said control system causes each air vehicle in the line abreast configuration to decouple from each neighboring air vehicle such that each air vehicle is subsequently capable of flight independent of the other air vehicles.

3. An air vehicle assembly according to claim 2 wherein said control system causes said air vehicles to recouple to one another once each air vehicle has flown independently of the other air vehicles.

4. An air vehicle assembly according to claim 1 wherein said control system is distributed between said air vehicles with each air vehicle including that portion of said control system that directly controls the respective air vehicle, and wherein those portions of said control system resident in different air vehicles are adapted to communicate while said air vehicles are joined to one another.

5. An air vehicle assembly according to claim 1 wherein said control system directs said air vehicles to vertically take off.

6. An air vehicle assembly according to claim 1 wherein each air vehicle comprises:
an engine;
a propeller rotatably driven by said engine; and
at least one vane disposed in exhaust of said propeller, wherein each vane is responsive to said control system for at least partially controlling flight of said air vehicle.

7. An air vehicle assembly according to claim 6 wherein the engine is capable of providing differential thrust to at least partially control flight of said air vehicle.

8. An air vehicle assembly according to claim 6 wherein each air vehicle further comprises a shroud surrounding said propeller.

9. An air vehicle assembly according to claim 6 wherein each air vehicle further comprises a pair of wings extending outwardly from opposite sides of said propeller to respective wingtips.

10. An air vehicle assembly according to claim 9 wherein adjacent air vehicles are releasably joined to one another at their respective wingtips.

11. An air vehicle assembly according to claim 9 wherein each wing comprises an elevon that is responsive to said control system for at least partially controlling flight of said air vehicle.

12. An air vehicle assembly according to claim 9 wherein each wing comprises a cropped delta wing.

13. An air vehicle assembly according to claim 1 wherein said air vehicles comprise unmanned air vehicles.

* * * * *